US009604301B2

(12) United States Patent
Zhang et al.

(10) Patent No.: US 9,604,301 B2
(45) Date of Patent: Mar. 28, 2017

(54) METHOD TO MONITOR AND CONTROL WELD PENETRATION IN GAS TUNGSTEN WELDING AND FULL-POSITION PIPE WELDING

(71) Applicants: YuMing Zhang, Nicholasville, KY (US); Xiangrong Li, Peabody, MA (US); Zeng Shao, Lexington, KY (US)

(72) Inventors: YuMing Zhang, Nicholasville, KY (US); Xiangrong Li, Peabody, MA (US); Zeng Shao, Lexington, KY (US)

(*) Notice: Subject to any disclaimer, the term of this patent is extended or adjusted under 35 U.S.C. 154(b) by 478 days.

(21) Appl. No.: 13/694,231

(22) Filed: Nov. 13, 2012

(65) Prior Publication Data
US 2014/0131333 A1 May 15, 2014

(51) Int. Cl.
*B23K 9/09* (2006.01)
*B23K 9/095* (2006.01)
*B23K 9/028* (2006.01)
*B23K 9/167* (2006.01)

(52) U.S. Cl.
CPC .......... *B23K 9/0956* (2013.01); *B23K 9/0282* (2013.01); *B23K 9/0286* (2013.01); *B23K 9/09* (2013.01); *B23K 9/167* (2013.01)

(58) Field of Classification Search
CPC ....... B23K 9/095; B23K 9/167; B23K 9/0735
USPC .................................................. 219/130.31
See application file for complete search history.

(56) References Cited

U.S. PATENT DOCUMENTS 5,349,156 A * 9/1994 Madigan et al. ........ 219/130.01
6,188,041 B1 * 2/2001 Kim et al. ............... 219/121.63

OTHER PUBLICATIONS

AWS, Welding Handbook. 8th ed, ed. R.L. O'Brien. vol. 2. 1991, Miami, FL: American Welding Society.
Kotecki, D.J., D.L. Cheever, and D.G. Howden, Mechanism of ripple formation during weld solidification. Welding Journal, 1972. 51(8): p. 386s-391s.
Renwick, R.J. and R.W. Richardson, Experimental investigation of GTA weld pool oscillation. Welding Journal, 1983. 62(2): p. 29s-35s.
Zacksenhouse, M. and D.E. Hardt, Weld pool impedance identification for size measurement and control. ASME Journal of Dynamic Systems, Measurement, and Control, 1984. 105(3).
(Continued)

*Primary Examiner* — Brian Jennison

(57) ABSTRACT

The invention discloses a method to determine the weld joint penetration from arc voltage measurements in gas tungsten arc welding (GTAW). It is based on an observation on the dynamic weld pool surface in GTAW—the surface tends to first expand toward the electrode and then be pushed away from the electrode after full penetration is established. For the pool surface in GTAW, localized partial keyholes around the arc axis as in plasma arc welding are not significant. The pool surface is relatively smooth. The arc voltage that reflects changes in the arc length thus first tends to reduce and then increases after full penetration is established. This invention thus tracks the arc voltage until the decrease slope becomes insignificant. Once full penetration is established, the current is reduced to decrease the weld penetration or first decrease the penetration growth for a certain period and then decrease the weld penetration.

13 Claims, 4 Drawing Sheets

Illustration of pulsing GTAW penetration monitoring and control (This Invention)

(56) References Cited

OTHER PUBLICATIONS

Xiao, Y.H. and G.d. Ouden, Weld pool oscillation during GTA welding of mild steel. Welding Journal, 1993. 72(8): p. 428s-434s.
Anedenroomer, A.J.R. and G.d. Ouden, Weld pool oscillation as a tool for penetration sensing during pulsed GTA welding. Welding Journal, 1998. 77(5): p. 181s-187s.
Graham, G.M. and I.C. Ume, Automated system for laser ultrasonic sensing of weld penetration. Mechatronics, 1997. 7(8): p. 711-721.
Hopko, S.N. and I.C. Ume, Laser generated ultrasound by material ablation using fiber optic delivery. Ultrasonics, 1999. 37(1): p. 1-7.
Chen, W. and B.A. Chin, Monitoring joint penetration using infrared sensing techniques. Welding Journal, 1990. 69(4): p. 181s-185s.
Nagarajan, S., et al., Control of the welding process using infrared sensors. IEEE Transaction on Robotics and Automation, 1992. 8(1): p. 86-93.
Banerjee, P., Infrared sensing for on-line weld shape monitoring and control. ASME Journal of Engineering for Industry, 1995. 117: p. 323-330.
Wikle III, H.C.W., Zee, R.H. Zee, and Chin, B.A. Chin, Sensing System for weld process control. Journal of Materials Processing Technology, 1999. 89-90: p. 254-259.
Song, J.B. and D.E. Hardt, Closed-loop control of weld pool depth using a thermally based depth estimator. Welding Journal, 1993. 72(10): p. 471s-478s.
Song, J.B. and D.E. Hardt, Dynamic Modeling and adaptive control of the gas metal arc welding process. ASME Journal of Dynamic Systems, Measurement, and Control, 1994. 116(3).
Tsai, C.H., K.H. Hou, and H.T. Chuang, Fuzzy control of pulsed GTA welds by using real-time root bead image feedback. Journal of Materials Processing Technology, 2006. 176(1-3.
Akselsen, O.M., A. Harsvaer, and H. Fostervoll, Root bead profiles in hyperbaric GTAW of X70 pipe line. International Journal of Offshore and Polar Engineering, 2006. 16(2): p.
Yudodibroto, B.Y.B., et al., Influence of filler wire addition on weld pool oscillation during gas tungsten arc welding. Science and Technology of Welding and Joining, 2004. 9.
Li, X.C., D. Farson, and R. Richardson, Weld penetration control system design and testing. Journal of Manufacturing Systems, 2001. 19(6): p. 383-392.
Chen, S.B., et al., Intelligent methodology for sensing, modeling and control of pulsed GTAW part 2—Butt joint welding. Welding Journal, 2000. 79(6): p. 164s-174s.
Zhang, Y.M., Vision based Weld-Face Adaptive Control of Weld Joint Penetration in Gas Tungsten Arc Welding. 1990, Harbin Institute of Technology: Harbin, China.
Zhang, Y.M., et al., Determining joint penetration in GTAW with vision sensing of weld-face geometry. Welding Journal, 1993. 72(10): p. 463s-469s.
Song, H.S. and Y.M. Zhang, Measurement and analysis of three-dimensional specular gas tungsten arc weld pool surface. Welding Journal, 2008. 87(4): p. 85s-95s.
Wang, Z., X. Ma, and Y. Zhang, Simultaneous imaging and measurement of pool surface and metal transfer. Welding Journal, 2011. 90(6): p. 121s-128s.
Li, X., et al., Manual Keyhole Plasma Arc Welding with Application. Welding Journal, 2011. 90(12): p. 258s-264s.
Li, X., Model Predictive Control over Manual Pipe Welding Process on Stainless Steel, in Electrical Engineering. 2010, University of Kentucky: Lexington. p. 91-118.
Zhang, Y.M. and Y.C. Liu, Modeling and control of quasi-keyhole arc welding process. Control Engineering Practice, 2003. 11(12): p. 1401-1411.
Lu, W., Y.M. Zhang, and W.Y. Lin, Nonlinear interval model control of quasi-keyhole arc welding process. Automatica, 2004. 40(5): p. 805-813.
Li, X.R. Shao, Z., Zhang, Y.M., Kvidahl, L., 2013. "Monitoring and control of penetration in GTAW and pipe welding," Welding Journal, 92(6): 190s-196s.
Haber, R. and L. Keviczky, Nonlinear System Identification: Nonlinear system parameter identification. vol. 1. 1999, Dordrecht, Netherlands: Kluwer Academic Publishers.

\* cited by examiner

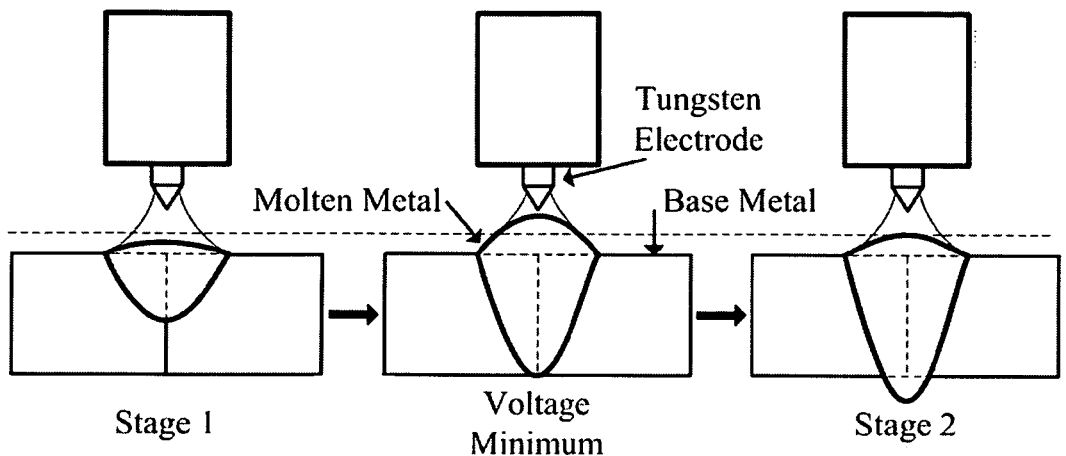
Fig. 1 Illustration of dynamic development of weld pool in GTAW (This Invention)
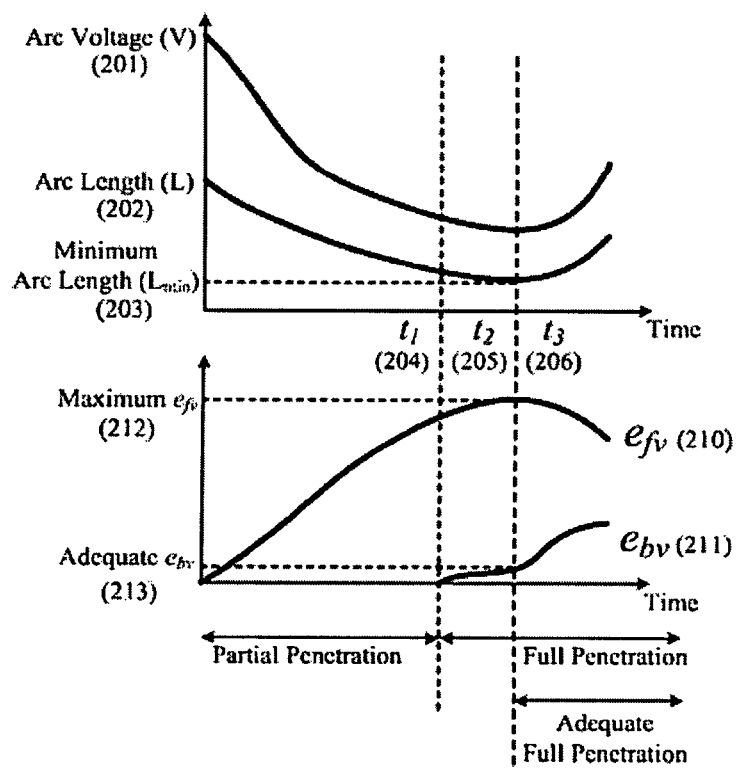
Fig. 2 Dynamic development of weld pool in GTAW (This Invention)

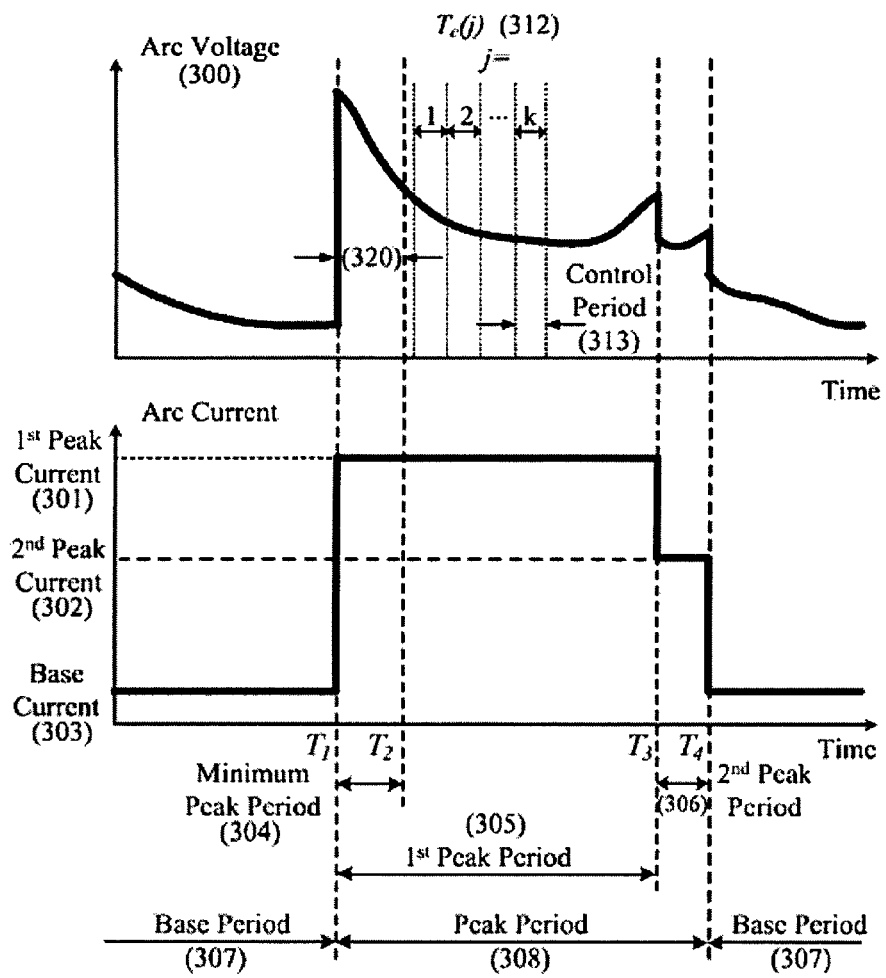
Fig. 3 Illustration of pulsing GTAW penetration monitoring and control (This Invention)

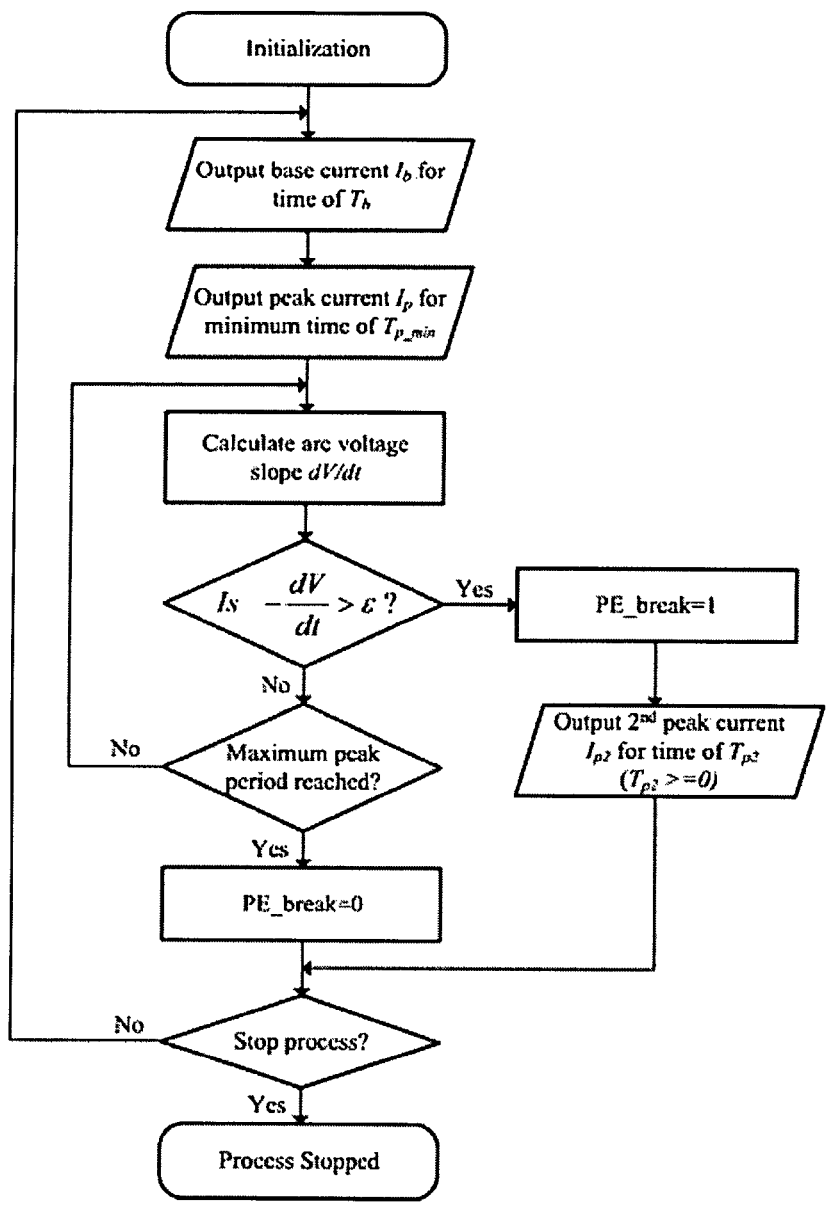
Fig. 4 Flowchart for monitoring and control of weld penetration (This Invention)

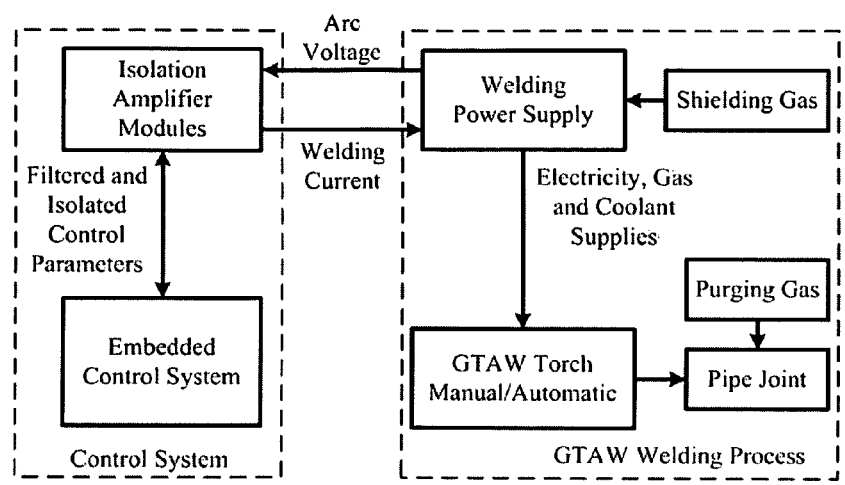
Fig. 5 Block diagram of an example GTAW weld penetration monitoring and control system (This Invention)

METHOD TO MONITOR AND CONTROL WELD PENETRATION IN GAS TUNGSTEN WELDING AND FULL-POSITION PIPE WELDING

GOVERNMENT INTEREST STATEMENT

The present invention was made with government support under contract number N00024-08-C-4111 awarded by the Department of the Navy. The government has certain rights in the invention.

Government support also includes matching fund from the Commonwealth of Kentucky (KSTC-184-512-08-048).

BACKGROUND

1. Field of Invention

The present invention relates in general to monitoring techniques for the Gas Tungsten Arc Welding process and more particularly to detecting whether the work piece has been fully penetrated.

2. Description of Related Art

Gas tungsten arc welding (GTAW) has become an indispensable tool for many industries because of the high-quality welds produced and low equipment costs[1]. Mechanized/automated systems rely on precision control of joint fit-up and welding conditions to use the pre-programmed welding parameters to produce repeatable results. However, precision control of joints and welding conditions is very costly and not always guaranteed. Up to date, there are no satisfactory sensors/approaches that can be conveniently carried by the torch to automatically monitor the penetration depth (how far the liquid metal penetrates along the thickness of the base metal) or the degree of the full penetration like a skilled welder.

The difficulty is primarily due to the invisibility of the liquid metal bottom surface underneath the weld pool and the extreme brightness of the arc and various methods have been studied, including pool oscillation, ultrasound, infrared sensor, etc. The pioneering work in pool oscillation was conducted by Kotecki[2], Richardson[3], Hardt[4] and their co-workers. Den Ouden found an abrupt change in the oscillation frequency of the pool during the transition from partial to full penetration[5, 6]. At Georgia Institute of Technology, Ume leads the development of non-contact ultrasonic penetration sensors based on laser-phased array techniques[7, 8]. Because the temperature distribution in the weld zone contains abundant information about the welding process, infrared sensing of welding processes has been explored by Chin at Auburn University [9-12]. The penetration depth has been correlated with the infrared characteristics of the infrared image. At MIT, Hardt used an infrared camera to view the temperature field from the back-side[13]. The penetration depth was precisely estimated from the measured temperature distribution and then controlled[14]. Because of the difficulty of the problem and the urgency for solution, researchers around the world have continued the explorations [15-19].

Zhang found that the average sag depression of the solidified weld bead has a good linear correlation with the back-side bead width[20, 21]. A structured-light vision sensor and image processing algorithm were thus developed to measure the sag geometry in GTAW. By modeling the arc welding process, an adaptive control system has been completed to achieve the desired back-side bead width[22]. Recently, the University of Kentucky developed an innovative method to measure the 3D geometry of the weld pool surface for both GTAW and gas metal arc welding (GMAW) [22, 23]. It projects a low power laser pattern onto the mirror/specular surface of the weld pool. The laser pattern reflected from the weld pool surface remains the laser intensity when travelling from the arc and weld pool but the arc radiation loses its intensity. The reflected laser and arc radiation can thus be intercepted and be imaged on the interception plane. Because the arc radiation reduces as the travel distance increases, the reflected laser pattern (signal) can be clearly distinguished from the arc radiation (background). The 3D weld pool surface that reflects the laser pattern can then be computed from the measured laser reflection pattern and its known incident pattern based on the law of reflection. A vision system may thus be developed to emulate a skilled welder to observe and control the weld joint penetration. However, easily measurable arc signals, arc voltage and arc current, may be more durable and cost-effective and thus more suitable for industrial applications.

Possible relationship between weld joint penetration and arc signals has been extensively studied at the University of Kentucky Welding Research Lab[24-27]. Successful monitoring and control over the weld joint penetration have been achieved for plasma arc welding (PAW) process. Since PAW is an extension of GTAW process with a constrained arc for higher energy and heat density, it is ideal if the method for PAW process control can be extended to GTAW. Unfortunately, the inventors of this invention found that for the unconstrained free arc in GTAW, the arc voltage does not increase as the weld penetration increases as in PAW and as one may expect. Instead, the arc voltage decreases first as the weld penetration increases. It increases only after the full penetration is sufficiently established. An innovative arc signal based weld penetration monitoring and control method is thus invented based on this characteristic of the arc voltage change as the weld pool surface develops in GTAW and is used to solve the weld penetration control issue in GTAW pipe welding.

BRIEF SUMMARY OF THE INVENTION

Hence the objective of this invention is to provide an easily implementable method to monitor the establishment of the full penetration from the partial penetration on the work-piece and then use this information to adjust the welding parameters in real-time to assure that the desired full penetration weld be produced without burn-through in gas tungsten arc welding.

When the work-piece is melted by an arc from the front-side, the metal melted from the work-piece forms a liquid weld pool that grows from the front-side toward the back-side gradually in the depth direction. That is, the work-piece becomes melted from the front-side toward the back-side. To produce a full penetration weld, the work-piece must be fully melted in the depth direction such that the back-side surface of the work-piece changes from solid to liquid.

An easily implementable method for practical application to monitor the establishment of the full penetration (back-side surface becomes liquid) from the partial penetration (back-side surface is still solid/un-melted) first must be able to sense the change in the back-side surface from the front-side without placing a sensor from the back-side which cannot be easily carried together with the torch. To be accurate, it must be based on the inherent/fundamental change that is detectable from the front-side but is caused by the change in the back-side (from solid to liquid).

When the metal on the work-piece is heated to melt, the temperature is much increased. The volume of the melted metal is much increased from its original volume when being solid. Since the free liquid metal in the weld pool is constrained, in all directions except for the front-face direction, by the solid metal around it in the work-piece, the increased volume can only freely extend in the front-surface direction. The surface of the weld pool thus must elevate toward the tungsten electrode in the front-side direction. However, after the back-side surface is melted, the constraint condition is changed. The liquid metal in the weld pool may also extend beyond the back-side surface especially under the pressure from the arc. As a result, part of the increased volume will not extend toward the electrode. This is the inherent change that can lead to an accurate method to detect the change in the back-side surface from the front-side surface.

An easily implementable method for practical application especially for manual welding also requires the sensor to be able to be carried by a man. Preferably, there should be any complex installation and calibration needed. To this end, the present invention detects the change in the surface elevation by monitoring the arc length which is the distance between the weld pool surface to the electrode. This is an easily implementable method because the change trend in the arc length can be easily measured by the change trend in the arc voltage without any added sensor and any calibration. Such characteristics, without added sensor (the arc voltage can be directly measured without any added sensor for the welder or robot to carry) and without any calibration, are also desirable for mechanized and robotic/automatic systems.

Of course, there is a condition needed in order for the arc length change to reflect the change in the surface elevation: the electrode needs to be stationary. When the electrode is stationary, the change in the distance between the surface and the electrode is only determined by the change in the surface elevation. Hence, the method in the present invention includes ways to maintain the electrode to stay stationary during the detection without interference on the ability of the arc length change to reflect the surface elevation change and ways to count for the effect of electrode movement and other factor (particularly filler metal addition) on the ability to reflect the surface elevation change.

There is another condition needed in order for the arc length change to reflect the change in the surface elevation: the electrode must be non-consumable. In the gas tungsten arc welding, this is assured by the use of the non-consumable tungsten electrode already. However, for gas metal arc welding (GMAW), the electrode is a continuously fed wire which is consumable. The consumable nature of the wire introduces a variation in the position of the electrode in relation to the work-piece. Further, the transfer of the melted wire into the weld pool affects the ability of the surface elevation to reflect the change in the increased volume. The prevent invention is thus a method that is specially designed according to the fundamental characteristics in the gas tungsten arc welding process. Fortunately, for the precision joining where accurate control of the weld penetration is needed, the gas tungsten arc welding is the primary process rather than the gas metal arc welding.

In conclusion, the present invention provides a method to use the front-side surface elevation change to detect the change in the back-side surface, to construct the conditions to assure the change in the arc length to reflect the change in the surface elevation, and to determine/adjust the welding parameters to generate the surface elevation change and control the process accordingly to assure the full penetration without burn-through (melted metal be detached from the work-piece) that causes a discontinuity rather than a weld. Since the needed arc length signal is easily measured by the arc voltage, the present invention requires no added sensors.

BRIEF DESCRIPTION OF THE DRAWINGS

FIG. 1 (This Invention) shows the dynamic development of the weld pool during the penetrating process in gas tungsten arc welding. The left figure shows that the liquid weld pool is constrained in all directions except for the front-side direction when the penetration is partial (stage 1). The middle figure shows the state when the penetration changes from the partial (stage 1) to full (stage 2). The right figure shows that the back-side surface is no longer solid after the full penetration (stage 2) is established and does not provide a constraint any more.

FIG. 2 (This Invention) shows the correspondence of the arc length and arc voltage with the changing elevation of the weld pool surface during the dynamic development of the weld pool in gas tungsten arc welding. In particular, $t_1$ corresponds to the stage when the penetration changes from partial to full. As the area of the back-side becoming liquid free surface increases, more liquid moves toward the back-side. In the period [$t_1$, $t_2$], the area of the free surface on the back-side is not sufficiently large such that part of the newly increased volume still has to move toward the electrode. That is, the increase in the back-side elevation $e_{bv}$ is not sufficient to decrease the front-side elevation $e_{fv}$. After $t_2$, the liquid metal moving toward the back-side is more than the newly increased volume. As such, the elevation in the front-side $e_{fv}$ decreases.

FIG. 3 (This Invention) helps illustrate how the arc voltage signal be processed to determine the establishment of the full penetration in gas tungsten arc welding in this invention. The arc voltage is linearly determined by the arc length when the current is unchanged. In the first peak period, the current is constant, the change in the arc voltage is proportional to the change in the arc length. When the tungsten electrode stays stationary, the change in the arc voltage is proportional to the change in the front-side surface elevation. During this period, the surface first elevates toward the tungsten electrode such that the arc length reduces. The arc voltage thus first decreases. Then the arc voltage reduction rate reduces and the arc voltage starts to increases after the back-side surface becomes liquid and increases its liquid area. At $T_3$, the voltage has increased exceeding a preset threshold (which may be zero) indicating that the desired degree of full penetration has been achieved, the current is reduced to the second peak and stays in the second period for a period time before the current is further reduced to the base current.

FIG. 4 (This Invention) is a flow chart for a control algorithm as a specific realization of this invention and will be explained step by step in the description.

FIG. 5 (This Invention) shows the principle of a control system as a specific realization of this invention. It consists of welding process and control system. The core of the control system is the embedded controller powered by a single board computer (SBC). The SBC stores the monitoring and control algorithm in its flash memory. A set of isolation amplifiers are used to isolate the low-voltage control circuit from the welding process. The arc voltage signal is measured from welding process, while welding current control command signal is sent back to welding process by the control system. A welding power supply receives the command signal from the control system to actually output the current through the GTAW torch to perform the welding. Pure Argon is used for shielding and purging.

EXPLANATION OF THE INVENTION

Dynamic Development of Weld Pool in GTAW [28]

In keyhole PAW, as more metal is melted, the depth of the localized partial keyhole increases such that the arc length and arc voltage increase[24]. Unfortunately, in GTAW, such positive correlation between the arc voltage and weld penetration is not observed as the authors originally expected. Analysis suggests that the free arc in GTAW does not severely deform the weld pool surface to form a significant localized cavity similarly as a constrained plasma arc. Instead, as more metal is melted, the increase in the volume elevates the weld pool surface toward the electrode such that the arc length and arc voltage are decreased. The weld pool and weld pool surface thus experience a dynamic development as illustrated in FIG. 1 for GTAW.

The dynamic development of the weld pool in GTAW is divided into two stages by the arc voltage/length minimum that is caused by the establishment of the full penetration. In Stage 1, the increased volume due to metal melting reduces the distance from the Weld pool surface to the electrode; in Stage 2, the liquid metal is pushed by the arc through the bottom surface and the ability of the arc to push increases as the bottom width of the weld pool increases.

More specifically, when the base metal is melted, its volume increases due to thermal expansion. The increased volume $\Delta v$ increases as the melted metal volume v increases. Before the bottom surface of the base metal is melted, i.e., before the full penetration is established, the increased volume $\Delta v$ is placed as an elevation of weld pool surface above the original base metal surface. The elevation of the front weld pool (volume beyond the original surface), $e_{fv}$, equals $\Delta v$ and thus increases as the melted metal increases and the weld penetration depth increases. Because of the free arc in GTAW, the arc length and arc voltage are expected to decrease. This is different from keyhole PAW where a significant cavity (localized partial keyhole) exists such that the arc length increases as the cavity depth increases and the bottom of the cavity is close to the bottom of the liquid metal pool. After the full penetration is established, part of the liquid metal is pushed by the arc beyond the original bottom surface of the base metal to form an elevation of the bottom weld pool surface. Denote the volume of this part of liquid metal as $e_{bv}$. As a result, $e_{fv}=\Delta v-e_{bv}$.

Before the full penetration is established, $e_{bv}=0$. Hence, this equation also holds before the full penetration is established.

Before the full penetration is established, $e_{fv}=\Delta v$. Since $\Delta v$ increases as the penetration increases, $e_{fv}$ also increases with the penetration. Because the arc length is defined approximately as the average length from the electrode to the weld pool surface in the arc region, the arc length and its measurement (arc voltage) decrease as $v_{fe}$ increases. After the full penetration is established, $e_{bv}>0$ such that $e_{fv}<\Delta v$. When $d(\Delta v)/dt>d(e_{bv})/dt$, $e_{fv}$ still increases as $\Delta v$ increases but will be at a reduced rate. The arc voltage will thus reduce at a reduced rate. However, as the penetration increases such that the width of the bottom weld pool surface increases, $d(\Delta v)/dt<d(e_{bv})/dt$ may occur. As a result, $e_{fv}$ will reduce instead. Because the capability of the arc to push the liquid metal to produce $e_{bv}$ increases with the penetration, $e_{fv}$ will reduce at an increased rate as the penetration increases.

The above discussion and analysis on the dynamic development of weld pool can be illustrated using FIG. 2. As can be seen, the full penetration is established first at $t=t_1$ and the minimum arc length is realized at $t=t_3$ when the change from $d(\Delta v)/dt>d(e_{bv})/dt$ to $d(\Delta v)/dt<d(e_{bv})/dt$ occurs. The inventors would argue that the arc length minimum is more significant than the establishment of the full penetration. This is because, for any practical application, a perfect alignment of the arc center with the weld seam and a perfect symmetry of the weld pool are not realistic. Without an adequate bead width on the bottom surface, the two members of the base metal would not be fully joined through their entire interface. The inventors would also argue that the penetration achieved when reaching the arc length minimum should not be excessive. In fact, $d(e_{bv})/dt$ is controlled by the width of the bottom weld pool surface. The arc length minimum $L_{min}$ 203 thus must occur before the width of the bottom weld pool surface becomes excessive such that more metal moves to the bottom. As a result, the arc length minimum $L_{min}$ 203 should be a simple yet effective indicator for an adequate full penetration. If the degree of the full penetration needs to increase or reduce, the slope of the arc voltage can be analyzed.

In GTAW, the arc voltage V 201 can be considered proportional to the arc length L 202 with certain accuracy and linearity. Assume the GTAW torch has a constant standoff distance from pipe surface, which is common in welding practice. By measurement of arc voltage signal V 201, the arc length L 202, or distance from tungsten electrode to weld pool surface, can be determined with certain accuracy. The arc length minimum $L_{min}$ 203 can thus be detected as the voltage minimum.

Weld Penetration Monitoring and Control Method

Based on the analysis of the dynamic development of weld pool in GTAW, the present method of this invention for monitoring and controlling the weld penetration is to detect the slope of arc voltage signal, i.e., dV(t)/dt during the peak period and adjust the welding current accordingly to control the weld joint penetration. A logic way to control the weld joint penetration is to switch the current from the peak current 301 to the base current 303 when the slope is changed from negative to positive at $t=t_3$ as in FIG. 2. However, this slope sign change only occurs after the full penetration is established. If an excessive peak current is used to establish the weld penetration, the time period from full penetration establishment to this slope sign change, i.e., $t_3-t_1$, may be short. In such case, if the instant $t-t_3$ is not accurately detected resulting in a significant delay, switching the current from this excessive peak amperage to the base current amperage with such a significant delay may cause burn-through or excessive penetration. Since the weld pool surface and arc voltage fluctuate, such a delay is typically unavoidable. Hence, a better way to control the weld penetration is to first reduce the current from the peak amperage 301 to a lower second peak current amperage 302 after the amplitude of the negative slope of the arc voltage falls below a threshold $\epsilon$ at $t=t_2$ (FIG. 2). The reduced second peak current 302 would allow the penetration to grow at a reduced speed. The required accuracy and speed for the slope analysis can thus be reduced. However, if the application does not require an excessive peak current 301, the current can be directly changed to the base current 303. The second peak current 302 can thus be optional.

In summary, the method in this invention uses three current levels: the peak current 301 that is used to rapidly establish the penetration is referred to as the peak current or the first peak current; the second peak level current 302 during which the penetration increase speed is reduced is referred to as the second peak; the current that follows the second peak is still referred to as the base current 303 in the convention. The second peak period 306 is optional and can better help the weld penetration control accuracy especially when the peak current 301 is excessive. The slope of the voltage signal is measured and analyzed during the first peak period 305 and the current is switched to the second peak 302 or base current 303 after $-dV(t)/dt$ falls below the threshold $\epsilon$. The threshold $\epsilon$ can be set $\epsilon \geq 0$ with $\epsilon > 0$ to detect $t_2$ and $\epsilon = 0$ to detect $t_3$. Further, a negative $\epsilon$ with a small amplitude may be used to achieve even greater penetration.

In implementation, the slope is calculated from discrete-time voltage measurement V(k) in the present control period $T_c(k)$ 312 and voltage measurements V(k−1), ..., V(1) in the previous control periods $T_c(k-1)$, ..., $T_c(1)$. In each control period, the voltage is sampled N times at sampling period $\Delta T$. The control period is thus $N\Delta T$ and $V(j) = \Sigma_{i=1}^{N} v(i)/N$ (j=1, ..., k) is the average of the voltages v(i)(1=1, ..., N) measured in all sampling periods. If V(k) is judged as the vertex based on analysis of voltage measurements V(k), ..., V(1), the current is reduced from its peak level 301 to an optional second peak level 302 or directly to the base level 303. The heat input associated with this lower peak level 302 is greater than the heat dissipated and this optional second peak 302 thus will continue to increase the weld penetration to the desired level. However, because of the reduced current, the arc pressure will be reduced such that the possibility to burn-through is reduced. The penetration increasing speed after the full penetration is established at $t=t_1$ (FIG. 2) is thus slower than that before the full penetration is established. This reduced speed helps for better control of the weld penetration. After the desired penetration is achieved, the current is reduced to the base level 303. The heat input associated with the base current 303 is much lower than the heat dissipated. The weld pool thus gradually freezes during the base current period 307.

The control period $T_c$ 313 should be determined based on the arc fluctuation frequency and the accuracy requirement for the weld penetration monitoring and control. The control period 303 should be much greater than the fluctuation frequency of the arc voltage. However, if the control period 313 is too long, the resolution of the weld penetration control deteriorates. A desirable way to determine the control period 313 is to use a given control period 313 and apply the first peak current 301 for k control periods. Keep all other parameters constant appropriate and change k. The weld penetration change with k can be examined. If the desired penetration can be achieved with a specific k and the weld penetration achieved with k−1 and k+1 both acceptable, this control period 313 should be an acceptable control period. Otherwise, the control period can be reduced to determine if it may be acceptable. The inventors found that for GTAW 100 ms is an acceptable control period 313 although the control period may be chosen in a wider range.

The sampling period $\Delta T$ is less critical and should be determined based on the computation capability of the control system. N should be sufficient to calculate $V(j) = \Sigma_{i=1}^{N} v(i)/N$. When the control period is 100 ms, 1 ms is an acceptable sampling period although the sampling period may be chosen in a much greater range.

To determine the slope from V(k), ..., V(1), a model can be fit and be used to determine if the voltage vertex has been reached. Once the vertex is reached, the current is reduced to the lower peak 302. The lower peak 302 stays for a given time interval 306 pre-specified before it is reduced to the base current 303 to start the next pulse cycle. FIG. 3 illustrates the method invented.

FIG. 3 can be further elaborated to explain the invention:

Step a: Initialization of process, including welding parameters and control parameters.

Step b: Output the base welding current $I_b$ 303 for a base period of $T_b$ 307. The relatively lower heat allows the weld pool to cool down and prepare for the peak period 308.

Step c: Output the peak welding current $I_p$ 301 for a minimum peak period $T_{p\_min}$ 304. This minimum peak period 304 is applied in order for the arc voltage 300 to pass the initial transient period 320 when the current is changed.

Step d: Continue to apply the peak welding current $I_p$ 301. The controller samples the arc voltage signal 300 at the pre-specified sampling period $\Delta T$ (for example, 1 ms) for N (for example, N=100) times. The average V(k) is calculated. V(k), ..., V(1) are fitted by a second order parabola. The slope (first order derivative) of the parabola at k indicates the change tendency of the arc voltage.

Step e: If the calculated $$-\frac{dv(t)}{dt}$$

at the present time $t=kT_c$ is greater than a pre-determined threshold $\epsilon$, the flag variable PE_break (where PE stands for penetration establishment) is set to 1, and continue to step f. Otherwise, jump to step d for another control period $T_c$ if the application time of the peak current $T_p < T_{p\_max}$ or keep PE_break=0 and jump to step f if $T_p \geq T_{p\_max}$ where $T_{p\_max}$ is the pre-specified maximum period for the first peak current.

Step f: If PE_break=0 (the vertex is not reached until the maximum peak period), jump to step b. For PE_break=1, if the application of the optional second peak 302 is enabled, apply the second peak current $I_{p2}$ for $T_{p2}$ 306 and then jump to step b; if not enabled, directly jump to step b. If the welder requires to stop the process (either a problem occurs, or the weld joint is completed welded), jump to step g.

Step g: Stop the process.

A flow chart is also given in FIG. 4 to further demonstrate the algorithm.

Model Fit for Slope Analysis

The voltage measurements V(k), ..., V(1) may be fit using a first, second, or third order model. The second order parabola fitting model was found to produce acceptable accuracy at moderate computation cost for real-time analysis of the vertex. The second order model can be written as $$V(j) = \alpha_0 + \alpha_1 j + \alpha_2 j^2 \quad (j=1,2,\ldots,k) \tag{1}$$

where $\alpha_0$, $\alpha_1$, and $\alpha_2$ are the model parameters to be fit. Denote $$\Phi = \begin{bmatrix} 1 & 1 & 1^2 \\ 1 & 2 & 2^2 \\ \vdots & \vdots & \vdots \\ 1 & k & k^2 \end{bmatrix}, \theta = \begin{bmatrix} a_0 \\ a_1 \\ a_2 \end{bmatrix} \text{ and } Y = \begin{bmatrix} V(1) \\ V(2) \\ \vdots \\ V(k) \end{bmatrix} \tag{2}$$

Using the least square algorithm [29], the coefficient of model (1) can be estimated by $$\hat{\theta} = (\Phi^T \Phi)^{-1} \Phi^T Y \tag{3}$$

where $\hat{\theta} = (\hat{\alpha}_0, \hat{\alpha}_1, \hat{\alpha}_2)^T$ is the estimated model parameters. The slope, or first-order derivative, at the present time k is:

$$V'(k) = \hat{\alpha}_1 + \hat{\alpha}_2 k \quad (4)$$

where V'(k) is defined as dV(t)/dt at $t=kT_c$. To determine the slope, only two coefficients ($\alpha_1, \alpha_2$) need to be estimated. If the number of sampling points k is fixed for all curve fitting, the matrix of $(\Phi^T\Phi)^{-1}\Phi^T$ can be calculated in an off-line manner before implementing into the embedded control system. To obtain the two coefficients, k×2 multiplication and (k−1)×2 addition operations are needed. To this end, the most recent k voltage measurements are used and they are or-ordered as V(k), . . . , V(1).

In order to further reduce the computation load for implementation in an embedded system, the most recent k measurements can be arranged as V(0), . . . , V(−k+2), V(−k+1) and the model can be written as $$V(j) = \alpha_0 + \alpha_1 j + \alpha_2 j^2 (j = -k+1, -k+2, \ldots, 0) \quad (1A)$$

Then, $$\Phi = \begin{bmatrix} 1 & -k+1 & (-k+1)^2 \\ 1 & -k+2 & (-k+2)^2 \\ \vdots & \vdots & \vdots \\ 1 & 0 & 0^2 \end{bmatrix}, \quad Y = \begin{bmatrix} V(-k+1) \\ V(-k+2) \\ \vdots \\ V(0) \end{bmatrix} \quad (2A)$$

Then the slope at the present time is $$V'(0) = \hat{\alpha}_1 \quad (4A)$$

As a result, only one model coefficient needs to be estimated. The calculation load is then reduced to only k multiplication and (k−1) addition operations.

Torch Travel and Wire Filler

The welding torch can travel in a continuous mode or stepwise mode. In both modes, the optional arc length control and optional filler wire addition are implemented during the base period and/or the optional second peak period. When the voltage is measured to perform the model fitting and vertex analysis, the arc length control and wire filler addition that may affect the analysis accuracy are not implemented.

The stepwise mode torch motion is preferred. If the continuous travel model is used, the work-to-tungsten distance during the first peak current period must be minimized or the distance slope is added as additional information to analyze the vertex.

Further, the torch travel can be manual or mechanized/automated. The filler wire addition can be manual or mechanized/automated.

Full Position Pipe Welding

When the welding position changes during pipe welding at the fixed position (i.e., the torch turns around the pipe such that angle of its axis with the gravitation axis from zero to 180 degree and then back to zero), the gravitational force acting on the weld pool changes. However, if the bottom surface of the work-piece surface is not melted, i.e., if the full penetration is not established, weld pool metal can still only elevate toward the tungsten. The negative dV(t)/dt is still observed before the full penetration is established at $t=t_1$. After the full penetration is established, the arc pressure may push the liquid metal in the weld pool beyond the bottom surface such that the amplitude of dV(t)/dt reduces after $t=t_1$ especially after $t=t_3$. Hence, −dV(t)/dt<$\epsilon$ can still be used to determine when the peak current is reduced to the second peak or the base current despite the actual welding position.

At the bottom position of the pipe, the gravitational force of the liquid metal in the weld pool must be overcome by the arc pressure in order to effectively push the liquid metal beyond the bottom surface. Because the mass (and gravitational force) of the weld pool metal increases faster than the wall thickness of the pipe increases, positive dV(t)/dt may never be realized at the bottom position when welding thick wall pipes achieved. Hence, $\epsilon$ may be increased when the torch travels from 12 o'clock to 6 o'clock and decreased when the torch travels from 6 o'clock to 12 o'clock for thick wall pipes. The change of $\epsilon$ may be experimentally determined. For 3.2 mm wall thickness stainless steel pipe, it was found $\epsilon=0$ is applicable for all the positions [28].

EXAMPLE

FIG. 5 gives an example of the system used to implement the method of this invention. It consists of welding process and control system.

The core of the control system is the embedded controller powered by a BL5S220 single board computer (SBC) from Digi International. The SBC is capable of executing the monitoring and control algorithm, to be proposed and detailed later, stored in its flash memory. A set of isolation amplifiers from Dataforth are used to isolate the low-voltage control circuit from the welding process. The isolation amplifier modules also provide hardware low-pass filtering to the welding signals from/to the welding process. The arc voltage signal is measured from welding process, while welding current control command signal is sent back to welding process by the control system. A Miller Dynasty 350 welding power supply is used as a current source. A HW-20 GTAW torch from ESAB is mounted on an orbital pipe welding platform to conduct automatic pipe welding, or held by welders for manual operations. Pure Argon is used for shielding and purging.

REFERENCES

1. AWS, *Welding Handbook*. 8th ed, ed. R. L. O'Brien. Vol. 2. 1991, Miami, Fla.: American Welding Society.
2. Kotecki, D. J., D. L. Cheever, and D. G. Howden, *Mechanism of ripple formation during weld solidification*. Welding Journal, 1972. 51(8): p. 386s-391s.
3. Renwick, R. J. and R. W. Richardson, *Experimental investigation of GTA weld pool oscillation*. Welding Journal, 1983. 62(2): p. 29s-35s.
4. Zacksenhouse, M. and D. E. Hardt, *Weld pool impedance identification for size measurement and control*. ASME Journal of Dynamic Systems, Measurement, and Control, 1984. 105(3): p. 179-184.
5. Xiao, Y. H. and G. d. Ouden, *Weld pool oscillation during GTA welding of mild steel*. Welding Journal, 1993. 72(8): p. 428s-434s.
6. Anedenroomer, A. J. R. and G. d. Ouden, Weld pool oscillation as a tool for penetration sensing during pulsed GTA welding. Welding Journal, 1998. 77(5): p. 181s-187s.
7. Graham, G. M. and I. C. Ume, *Automated system for laser ultrasonic sensing of weld penetration*. Mechatronics, 1997. 7(8): p. 711-721.
8. Hopko, S. N. and I. C. Ume, *Laser generated ultrasound by material ablation using fiber optic delivery*. Ultrasonics, 1999. 37(1): p. 1-7.

9. Chen, W. and B. A. Chin, *Monitoring joint penetration using infrared sensing techniques.* Welding Journal, 1990. 69(4): p. 181s-185s.

10. Nagarajan, S., et al., *Control of the welding process using infrared sensors.* IEEE Transaction on Robotics and Automation, 1992. 8(1): p. 86-93.

11. Banerjee, P., *Infrared sensing for on-line weld shape monitoring and control.* ASME Journal of Engineering for Industry, 1995. 117: p. 323-330.

12. Wikle III, H. C., Zee, R. H., and Chin, B. A., *Sensing System for weld process control.* Journal of Materials Processing Technology, 1999. 89-90: p. 254-259.

13. Song, J. B. and D. E. Hardt, *Closed-loop control of weld pool depth using a thermally based depth estimator.* Welding Journal, 1993. 72(10): p. 471s-478s.

14. Song, J. B. and D. E. Hardt, *Dynamic Modeling and adaptive control of the gas metal arc welding process.* ASME Journal of Dynamic Systems, Measurement, and Control, 1994. 116(3): p. 405-413.

15. Tsai, C. H., K. H. Hou, and H. T. Chuang, *Fuzzy control of pulsed GTA welds by using real-time root bead image feedback.* Journal of Materials Processing Technology, 2006. 176(1-3): p. 158-167.

16. Akselsen, O. M., A. Harsvaer, and H. Fostervoll, *Root bead profiles in hyperbaric GTAW of X70 pipe line.* International Journal of Offshore and Polar Engineering, 2006. 16(2): p. 123-127.

17. Yudodibroto, B. Y. B., et al., *Influence of filler wire addition on weld pool oscillation during gas tungsten arc welding.* Science and Technology of Welding and Joining, 2004. 9(2): p. 163-168.

18. Li, X. C., D. Farson, and R. Richardson, *Weld penetration control system design and testing.* Journal of Manufacturing Systems, 2001. 19(6): p. 383-392.

19. Chen, S. B., et al., *Intelligent methodology for sensing, modeling and control of pulsed GTAW part 2—Butt joint welding.* Welding Journal, 2000. 79(6): p. 164s-174s.

20. Zhang, Y. M., *Vision based Weld-Face Adaptive Control of Weld Joint Penetration in Gas Tungsten Arc Welding.* 1990, Harbin Institute of Technology: Harbin, China.

21. Zhang, Y. M., et al., *Determining joint penetration in GTAW with vision sensing of weld-face geometry.* Welding Journal, 1993. 72(10): p. 463s-469ϵ.

22. Song, H. S. and Y. M. Zhang, *Measurement and analysis of three-dimensional specular gas tungsten arc weld pool surface.* Welding Journal, 2008. 87(4): p. 85s-95s.

23. Wang, Z., X. Ma, and Y. Zhang, *Simultaneous imaging and measurement of pool surface and metal transfer.* Welding Journal, 2011. 90(6): p. 121s-128s.

24. Li, X., et al., *Manual Keyhole Plasma Arc Welding with Application.* Welding Journal, 2011. 90(12): p. 258s-264s.

25. Li, X., *Model Predictive Control over Manual Pipe Welding Process on Stainless Steel*, in Electrical Engineering. 2010, University of Kentucky: Lexington. p. 91-118.

26. Zhang, Y. M. and Y. C. Liu, *Modeling and control of quasi-keyhole arc welding process.* Control Engineering Practice, 2003. 11(12): p. 1401-1411.

27. Lu, W., Y. M. Zhang, and W. Y. Lin, *Nonlinear interval model control of quasi-keyhole arc welding process.* Automatica, 2004. 40(5): p. 805-813.

28. Li, X. R. Shao, Z., Zhang, Y. M., Kvidahl, L., 2013. "Monitoring and control of penetration in GTAW and pipe welding," Welding Journal, 92(6): 190s-196s.

29. Haber, R. and L. Keviczky, *Nonlinear System Identification: Nonlinear system parameter identification.* Vol. 1. 1999, Dordrecht, Netherlands: Kluwer Academic Publishers.

What is claimed is:

1. A method to produce a full penetration weld, where the back-side surface of the work-piece must be melted, reducing the possibility of burn-through, in gas tungsten arc welding, where the electrode is non-consumable tungsten, without a filler metal comprising
    applying a peak current of high amperage to melt the work-piece from the front-side of the work-piece to increase the weld pool formed by the metal melted from the work-piece;
    detecting and analyzing a signal that reflects the change in the elevation of the front-side weld pool surface with time;
    reducing the current to a low amperage base current based on the analysis of the detected signal which reflects the change in surface elevation and is determined the elevation has changed from toward the tungsten electrode to away from the tungsten electrode.

2. The method according the claim 1, wherein the amperage of the peak current causes the surface to continuously elevate toward the tungsten electrode while the back-side surface is still solid/unmelted.

3. The method according the claim 1, wherein the signal reflecting the change on the elevation of the weld pool surface is the change in the length of the arc, which can be measured by the arc voltage, between the weld pool surface and the tungsten electrode by holding the non-consumable tungsten electrode stationary.

4. The method according the claim 1, wherein the signal reflecting the change on the elevation of the weld pool surface is formed by subtracting the positive distance the torch moves away, or negative if toward, the work-piece from the arc length between the weld pool surface and the moving tungsten electrode, if the torch is not or cannot be held stationary.

5. The method according the claim 1, wherein the low amperage is sufficiently low for the given work-piece such that the depth of the weld pool will reduce.

6. The method according the claim 1, wherein the period for the application of the base current must be sufficiently long such that the back-side of the work-piece will become solidified.

7. The method according the claim 1, wherein the determination from "toward the tungsten electrode" to "away from the tungsten electrode" is made based on analysis of the signal reflecting the surface elevation, either simple analysis from two consecutive signal data by direct comparison or comprehensive analysis using more than two consecutive signal data.

8. A method to produce a full penetration weld while reducing the possibility of burn-through in gas tungsten arc welding without a filler metal comprising applying a first peak current of high amperage to melt the work-piece from the front-side of the work-piece to increase the weld pool formed by the metal melted from the work-piece;
    detecting and analyzing a signal that reflects the change in the elevation of the front-side weld pool surface with the time;
    reducing the current to a second peak current, of an amperage lower than that of the first peak current, after the front-side surface elevation is determined to have changed from toward the tungsten electrode to away from the tungsten electrode;

applying the second peak current for a period of time before applying a base current of an even lower amperage;

applying the base current for a period of time before again applying the first peak current.

9. The method according the claim 8, wherein the amperage of the first peak current must also be sufficiently high for the given work-piece such that the surface will continuously elevate toward the tungsten electrode as long as the back-side surface is still solid/unmelted.

10. The method according the claim 8, wherein the amperage of the second peak current is lower than that of the first peak current but is sufficiently high to still increase the degree of the full penetration.

11. The method according the claim 8, wherein the amperage of the base current is sufficiently low for the given work-piece such that the depth of the weld pool will reduce.

12. The method according the claim 8, wherein the period for the base current application must be sufficiently long such that the back-side of the work-piece will become solidified.

13. A method to produce a full penetration weld while reducing the possibility of burn-through in gas tungsten arc welding with a filler metal comprising applying a first peak current to melt the work-piece from the front-side of the work-piece to increase the weld pool formed by the metal melted from the work-piece without adding a filler metal;

detecting and analyzing a signal that reflects the change in the elevation of the front-side weld pool surface with the time;

reducing the current to a base current, or first to a second peak current if any and then to a base current, when the front-side surface elevation is determined to have changed from toward the tungsten electrode to away from the tungsten electrode;

applying the second peak current (if any) and the base current for respective periods before again applying the first peak current;

adding the filler metal is within the application of the second peak current (if any) and the based current.

* * * * *